(12) United States Patent
Topolovec (10) Patent No.: US 12,428,023 B2
(45) Date of Patent: Sep. 30, 2025

(54) SYSTEM FOR A VEHICLE (71) Applicant: Ford Global Technologies, LLC, Dearborn, MI (US)

(72) Inventor: Kenneth Topolovec, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 18/096,223

(22) Filed: Jan. 12, 2023

(65) Prior Publication Data

US 2024/0239366 A1 Jul. 18, 2024

(51) Int. Cl.
| | |
|---|---|
| *B25J 15/00* | (2006.01) |
| *B25J 9/16* | (2006.01) |
| *B60R 11/04* | (2006.01) |
| *B60W 60/00* | (2020.01) |
| *G06T 7/62* | (2017.01) |
| *G06T 7/73* | (2017.01) |
| *G06V 20/58* | (2022.01) |

(52) U.S. Cl.
CPC ........... *B60W 60/001* (2020.02); *B60R 11/04* (2013.01); *G06T 7/62* (2017.01); *G06T 7/73* (2017.01); *G06V 20/58* (2022.01); *B60W 2420/403* (2013.01); *G06T 2207/30252* (2013.01)

(58) Field of Classification Search
CPC ......... B60W 60/001; B60W 2420/403; B60W 2530/205; B60W 30/10; B60W 30/18036; B60W 30/18; B60R 11/04; B60R 1/22; B60R 1/26; B60R 2300/80; G06T 7/62; G06T 7/73; G06T 2207/30252; G06V 20/58; B60Y 2300/28; B62D 53/00
See application file for complete search history.

(56) References Cited

U.S. PATENT DOCUMENTS

| | | | |
|---|---|---|---|
| 10,346,705 | B2 | 7/2019 | Naserian et al. |
| 10,625,888 | B2 * | 4/2020 | Takeuchi ............. H05K 13/021 |
| 10,663,581 | B2 | 5/2020 | Decker et al. |
| 10,679,073 | B2 * | 6/2020 | Loeben .................. G01B 11/25 |
| 11,358,639 | B2 | 6/2022 | Raeis Hosseiny et al. |
| 11,660,746 | B2 * | 5/2023 | Osaka .................... B25J 9/1633 |
| | | | 700/228 |

(Continued)

FOREIGN PATENT DOCUMENTS

DE 102018219829 A 11/2018

*Primary Examiner* — Adam R Mott
*Assistant Examiner* — Ricardo I Viscarra
(74) *Attorney, Agent, or Firm* — Lorne Forsythe; Price Heneveld LLP (57) ABSTRACT

A system for a vehicle includes an imaging system and a controller. The imaging system outputs a signal that includes scene data of an area to a rear of the vehicle. The controller receives the scene data while a distance between the vehicle and the trailer is altered. The controller identifies a trailer within the area to the rear of the vehicle, identifies a plurality of keypoints of the trailer at a first time point—representing a first position, and identifies the plurality of keypoints of the trailer at a second time point—representing a second position. The controller estimates one or more dimensions of the trailer based on a change between the first position and the second position and determines one or more future vehicle paths based on such estimation. The one or more future vehicle paths correspond with vehicle maneuvers while the trailer is coupled to the vehicle.

18 Claims, 7 Drawing Sheets

(56) References Cited

U.S. PATENT DOCUMENTS

| | | | |
|---|---|---|---|
| 2015/0056053 A1* | 2/2015 | Sano | H05K 13/028 |
| | | | 414/755 |
| 2015/0120141 A1* | 4/2015 | Lavoie | B60W 30/06 |
| | | | 701/41 |
| 2018/0215035 A1* | 8/2018 | Ono | B25J 9/044 |
| 2018/0365509 A1* | 12/2018 | Naserian | G06V 20/56 |
| 2019/0118860 A1* | 4/2019 | Gali | G06V 20/20 |
| 2019/0122053 A1* | 4/2019 | Loeben | G06F 18/22 |
| 2019/0276173 A1* | 9/2019 | Takeuchi | H01L 21/67333 |
| 2019/0337344 A1* | 11/2019 | Yu | B60D 1/36 |
| 2019/0383902 A1* | 12/2019 | Yeo | G01S 7/35 |
| 2020/0101897 A1* | 4/2020 | Miller | B60D 1/36 |
| 2020/0114968 A1* | 4/2020 | Xu | B62D 15/0285 |
| 2020/0283242 A1* | 9/2020 | Osaka | B25J 9/1633 |
| 2021/0174545 A1* | 6/2021 | Agarwal | G06T 7/80 |
| 2021/0229509 A1* | 7/2021 | Raeis Hosseiny | B60D 1/26 |
| 2023/0064558 A1* | 3/2023 | Griffin | B60K 35/28 |

\* cited by examiner

SYSTEM FOR A VEHICLE

FIELD OF THE DISCLOSURE

The present disclosure generally relates to a system. More specifically, the present disclosure relates to a system for a vehicle.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a system for a vehicle includes an imaging system and a controller. The imaging system outputs a signal that includes scene data of an area to a rear of the vehicle. The controller receives the scene data while a distance between the vehicle and a trailer is altered; identifies the trailer within the area to the rear of the vehicle; identifies a plurality of keypoints of the trailer at a first time point, the positioning of the plurality of keypoints of the trailer at the first time point representing a first position; identifies the plurality of keypoints of the trailer at a second time point, the positioning of the plurality of keypoints of the trailer at the second time point representing a second position; estimates one or more dimensions of the trailer based on a change between the first position and the second position; and determines one or more future vehicle paths based on the estimating of the one or more dimensions of the trailer. The one or more future vehicle paths correspond with vehicle maneuvers while the trailer is coupled to the vehicle.

Embodiments of the first aspect of the disclosure can include any one or a combination of the following features:
- the controller estimates a vehicle translation and estimates a vehicle rotation of the vehicle between the first time point and the second time point;
- the controller estimates the vehicle translation and estimates the vehicle rotation between the first time point and the second time point by referencing a global positioning system of the vehicle or by referencing a wheel rotation sensor of the vehicle;
- the estimating one or more dimensions of the trailer based on the change between the first position and the second position includes calculating at least one measurement of the trailer based on the estimated vehicle translation and the estimated vehicle rotation; the at least one measurement of the trailer is chosen from a length of the trailer, a width of the trailer, and a height of a trailer coupler;
- the controller identifies a cargo item carried by the trailer;
- the controller identifies a plurality of keypoints of the cargo item at the first time point, the positioning of the plurality of keypoints of the cargo item at the first time point representing a first location; and the controller also identifies the plurality of keypoints of the cargo item at the second time point, the positioning of the plurality of keypoints of the cargo item at the second time point representing a second location;
- the controller estimates one or more dimensions of the cargo item based on a change between the first location and the second location;
- the estimating one or more dimensions of the cargo item based on the change between the first location and the second location includes calculating at least one measurement of the cargo item based on the estimated vehicle translation and the estimated vehicle rotation;
- the at least one measurement of the cargo item is chosen from a length of the cargo item and a width of the cargo item;
- the controller adjusts the one or more future vehicle paths based on the estimating of the one or more dimensions of the cargo item; and
- the imaging system includes a camera mounted on a rear of the vehicle and capturing at least a portion of the area to the rear of the vehicle.

According to a second aspect of the present disclosure, a system for a vehicle includes an imaging system and a controller. The imaging system outputs a signal that includes scene data of an area to a rear of the vehicle. The controller receives the scene data while a distance between the vehicle and a trailer is altered; identifies the trailer within the area to the rear of the vehicle; identifies a plurality of keypoints of the trailer at a first time point, the positioning of the plurality of keypoints of the trailer at the first time point representing a first position; identifies the plurality of keypoints of the trailer at a second time point, the positioning of the plurality of keypoints of the trailer at the second time point representing a second position; estimates a vehicle translation and estimates a vehicle rotation of the vehicle between the first time point and the second time point, and estimates one or more dimensions of the trailer based on a change between the first position and the second position, as well as the vehicle translation and the vehicle rotation of the vehicle. The estimating one or more dimensions of the trailer based on the change between the first position and the second position includes calculating at least one measurement of the trailer based on the estimated vehicle translation and the estimated vehicle rotation. The at least one measurement of the trailer is chosen from a length of the trailer, a width of the trailer, and a height of a trailer coupler. The controller also determines one or more future vehicle paths based on the estimating of the one or more dimensions of the trailer. The one or more future vehicle paths correspond with vehicle maneuvers while the trailer is coupled to the vehicle.

Embodiments of the second aspect of the present disclosure can include any one or a combination of the following features:
- the controller estimates the vehicle translation and estimates the vehicle rotation between the first time point and the second time point by referencing a global positioning system of the vehicle or by referencing a wheel rotation sensor of the vehicle;
- the controller identifies a cargo item carried by the trailer; identifies a plurality of keypoints of the cargo item at the first time point, the positioning of the plurality of keypoints of the cargo item at the first time point representing a first location; identifies the plurality of keypoints of the cargo item at the second time point, the positioning of the plurality of keypoints of the cargo item at the second time point representing a second location; and estimates one or more dimensions of the cargo item based on a change between the first location and the second location;
- the estimation of the one or more dimensions of the cargo item based on the change between the first location and the second location includes calculating at least one measurement of the cargo item based on the estimated vehicle translation and the estimated vehicle rotation, wherein the at least one measurement of the cargo item is chosen from a length of the cargo item and a width of the cargo item;

the controller adjusts the one or more future vehicle paths based on the estimating of the one or more dimensions of the cargo item, and the imaging system includes a camera mounted on a rear of the vehicle and capturing at least a portion of the area to the rear of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 2:
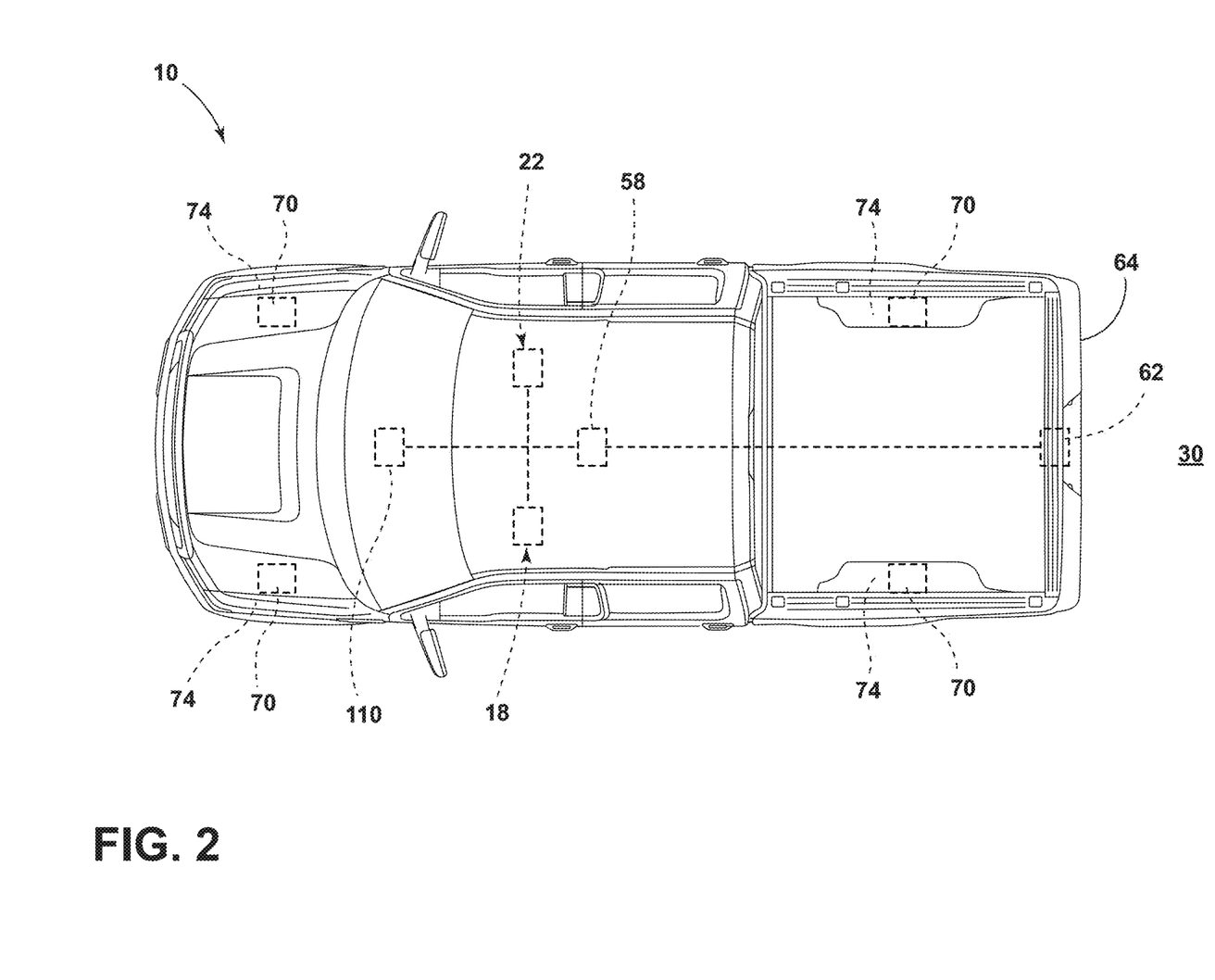
FIG. 2 is a top view of a vehicle, illustrating various components thereof, according to one example.
Figure 3:
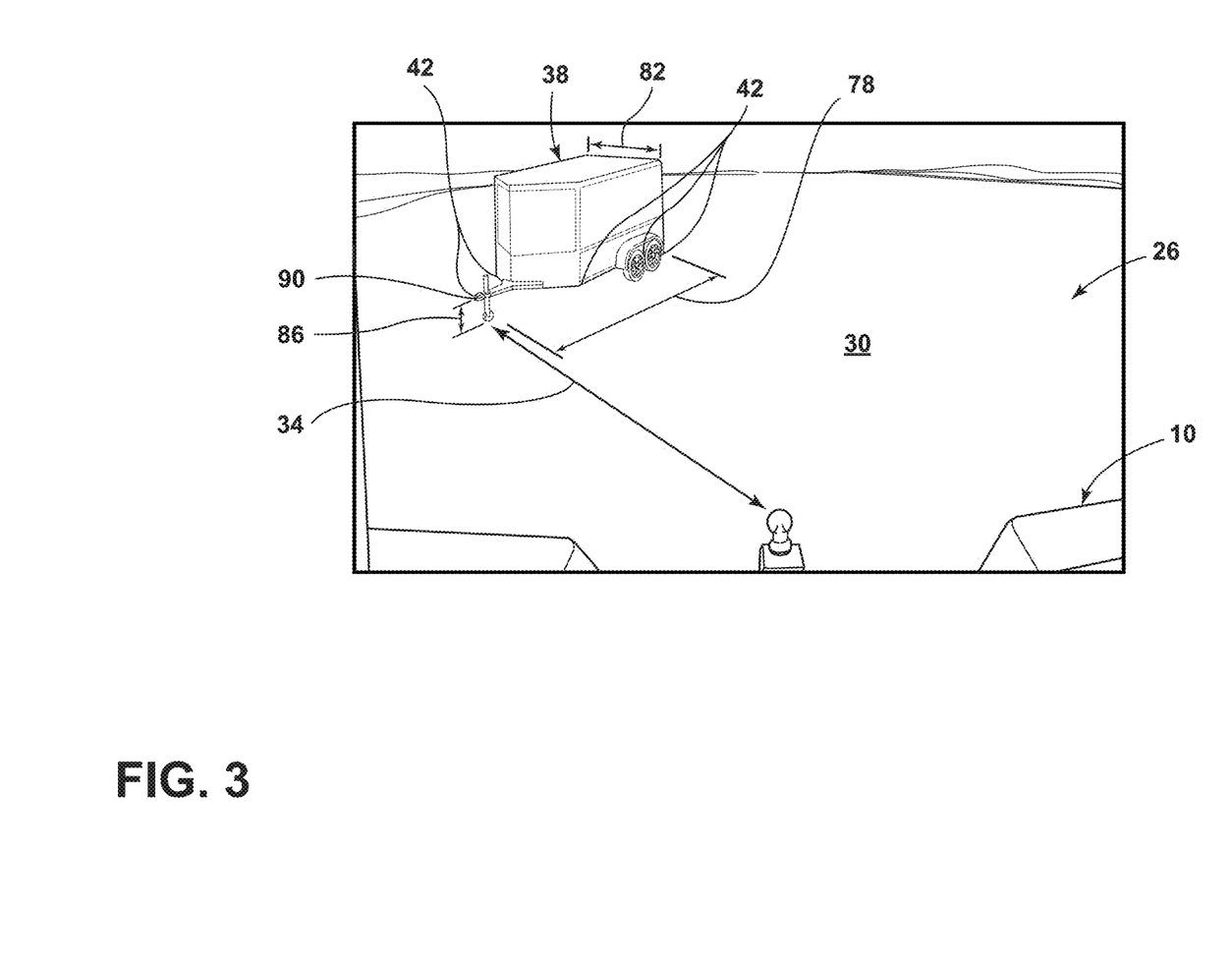
FIG. 3 is a depiction of a display of image data for presentation on a vehicle human-machine interface at a first time point, according to one example.
Figure 4:
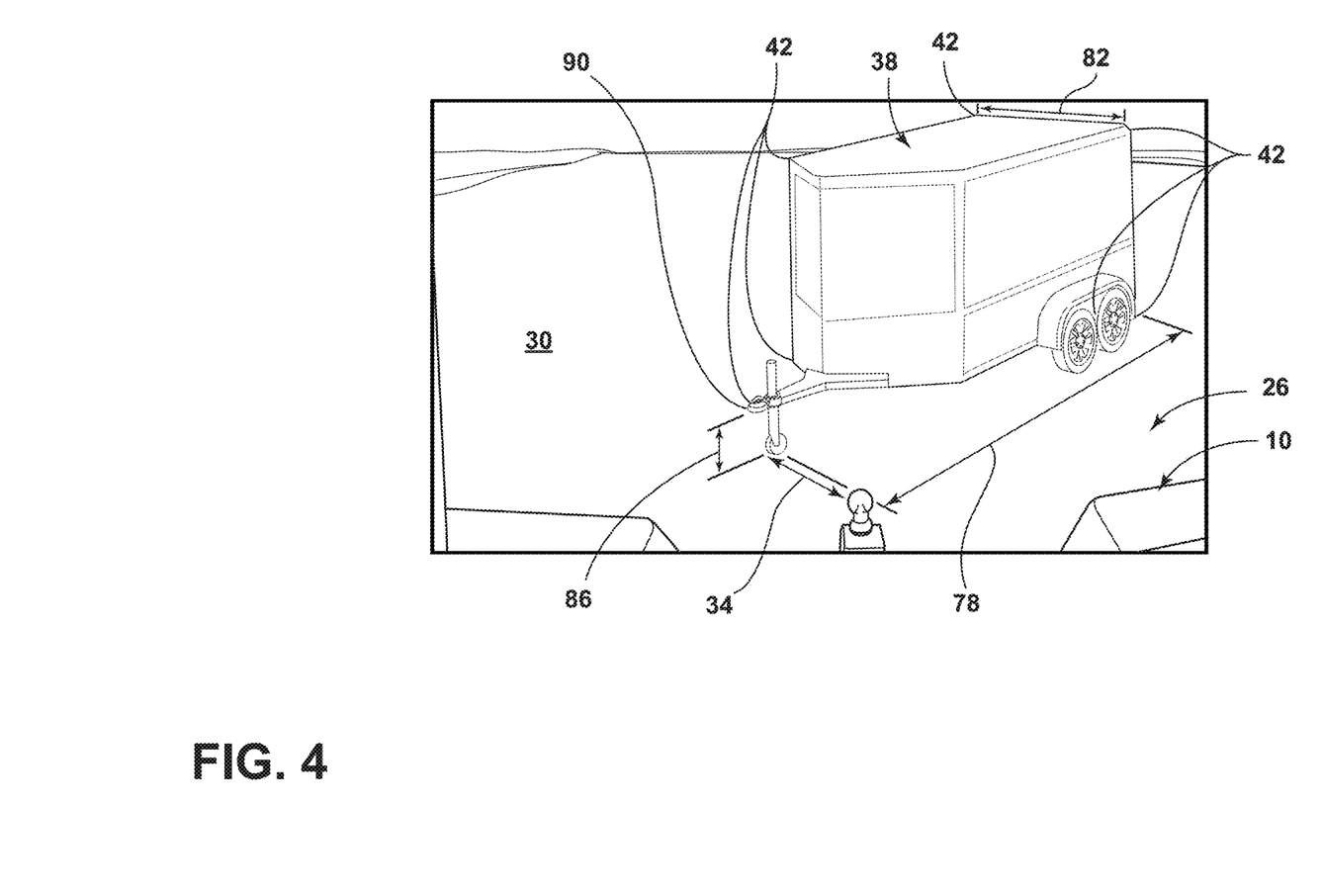
FIG. 4 is a depiction of a display of image data for presentation on the vehicle human-machine interface at a second time point, according to one example.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, reference numeral 10 generally designates a vehicle. A system 14 for the vehicle 10 includes an imaging system 18 and a controller 22. The imaging system 18 outputs a signal that includes scene data 26 of an area to a rear 30 of the vehicle 10. The controller 22 receives the scene data 26 while a distance 34 between the vehicle 10 and a trailer 38 is altered. The controller 22 identifies the trailer 38 within the area to the rear 30 of the vehicle 10. The controller 22 also identifies a plurality of keypoints 42 of the trailer 38 at a first time point (e.g., see FIG. 3 or FIG. 5). The positioning of the plurality of keypoints 42 of the trailer 38 at the first time point represent a first position. More specifically, the positioning of the plurality of keypoints 42 of the trailer 38 at the first time point represent a first position of the trailer 38 within the scene data 26. Said another way, the positioning of the plurality of keypoints 42 of the trailer 38 within an imaging sensor plane at the first time point may be referred to as a first position (e.g., a first pixel position of each of the keypoints 42). The controller 22 also identifies the plurality of keypoints 42 of the trailer 38 at a second time point (e.g., see FIG. 4 or FIG. 6). The positioning of the plurality of keypoints 42 of the trailer 38 at the second time point represent a second position. More specifically, the positioning of the plurality of keypoints 42 of the trailer 38 at the second time point represent a second position of the trailer 38 within the scene data 26. Said another way, the positioning of the plurality of keypoints 42 of the trailer 38 within the imaging sensor plane at the second time point may be referred to as a second position (e.g., a second pixel position of each of the keypoints 42). Further, the controller 22 estimates one or more dimensions of the trailer 38 based on a change between the first position and the second position.

Referring again to FIGS. 1-6, the controller 22 determines one or more future vehicle paths (e.g., vehicle maneuvers) based on the estimating of the one or more dimensions of the trailer 38. Said another way, the one or more estimated dimensions of the trailer 38 are employed by the controller 22 of the vehicle 10 to determine, or plan, one or more future paths of the vehicle 10. For example, the one or more estimated dimensions of the trailer 38 may be employed by the controller 22 to determine a future turning maneuver of the vehicle 10 that prevents contact between the trailer 38 and an environmental object (e.g., prevent a side-swipe event). In another example, the one or more estimated dimensions of the trailer 38 may be employed by the controller 22 to determine a future backing maneuver of the vehicle 10 that accounts for one or more of the dimensions of the trailer 38 (e.g., to aid in backing the trailer 38). Regardless of the particular example of how the controller 22 employs the one or more estimated dimensions of the trailer 38 to determine, or plan, a future path of the vehicle 10, the one or more future vehicle paths correspond with vehicle maneuvers while the trailer 38 is coupled to the vehicle 10. Accordingly, the controller 22 employs the scene data 26 that is obtained prior to the vehicle 10 being coupled to the trailer 38 for determining, or planning, one or more future travel paths of the vehicle 10 (e.g., vehicle maneuvers) after the trailer 38 has been coupled (e.g., hitched) to the vehicle 10.

Referring again to FIGS. 1 and 2, the vehicle 10 is shown as a schematic representation. The vehicle 10 includes the controller 22. The controller 22 may include a processor 46 and memory 50. The memory 50 stores one or more programmed software routines 54 that are executable by the processor 46. The software routines 54 can be utilized by the processor 46 to process signals and inputs from the vehicle 10 (e.g., the scene data 26). The controller 22 may include analog and/or digital circuitry such as in the form of the processor 46, according to one example. The controller 22 is communicatively coupled to a sensing system 58. The controller 22 is also communicatively coupled to the imaging system 18. The imaging system 18 can include an imager 62. In one example, the imager 62 may be a camera. In such examples, the imaging system 18 can include the camera as being mounted on a rear 64 of the vehicle 10 and capturing at least a portion of the area to the rear 30 of the vehicle 10. The sensing system 58 includes a device for measuring a distance traveled by the vehicle 10 and/or a device for measuring a change in a rotational position of the vehicle 10 within a real-world coordinate frame. For example, the sensing system 58 can include a global positioning system (GPS) 66, a wheel rotation sensor 70, wheel speed sensor(s), camera(s) (e.g., using camera odometry), radar sensor(s), and/or ultrasonic sensor(s). The device for measuring the change in the rotational position of the vehicle 10 can inform the controller 22 regarding a change in a rotational position of the vehicle 10 relative to the trailer 38 since the trailer 38 is stationary within the real-world coordinate frame prior to coupling with the vehicle 10.

Figure 1:
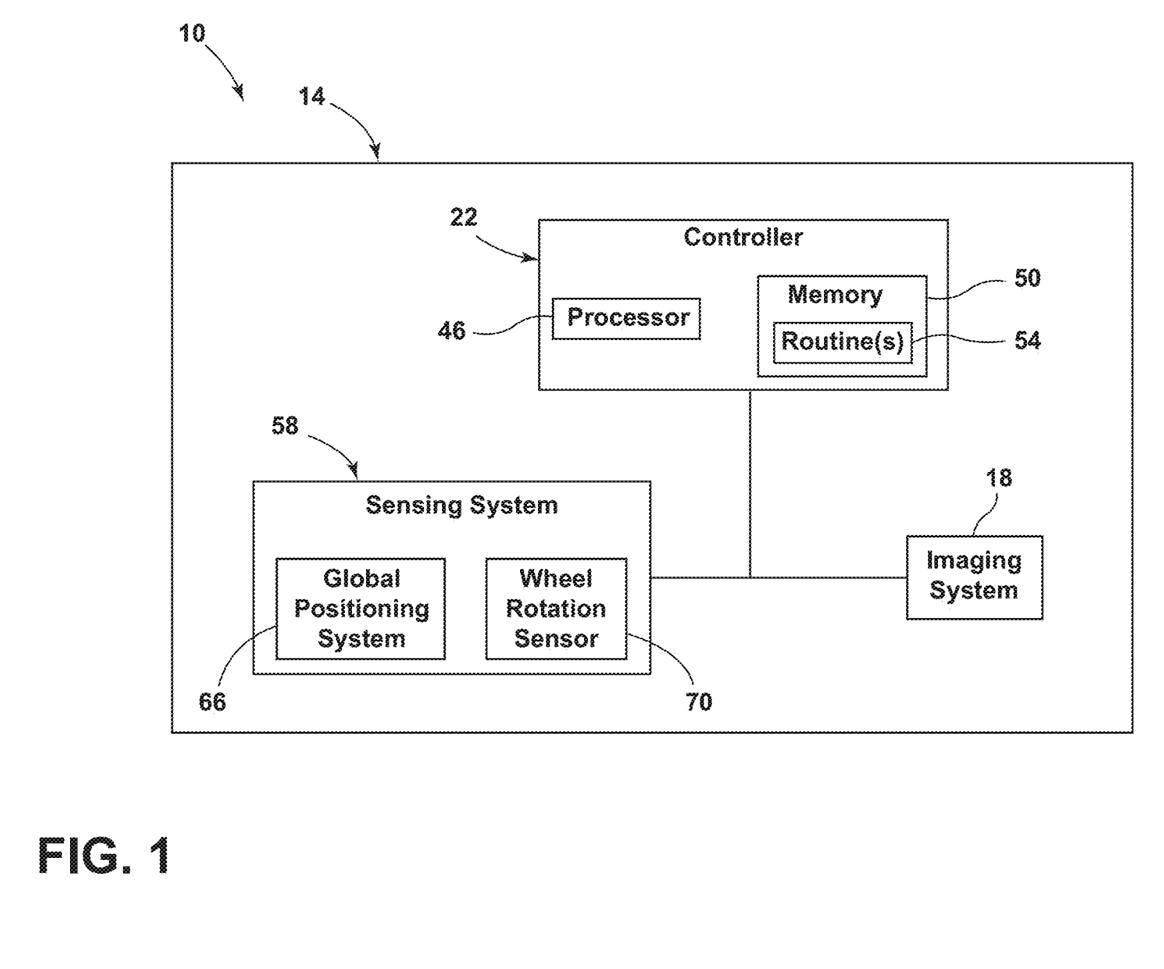
FIG. 1 is a schematic representation of a vehicle, illustrating various components thereof, according to one example.

Referring further to FIGS. 1 and 2, in examples that include the global positioning system 66, the vehicle 10 may measure a distance traveled by the vehicle 10 by referencing two or more GPS satellites at a first time point and a second time point. In such an example, a difference in a position of the vehicle 10 relative to the two or more GPS satellites may be attributed to movement of the vehicle 10 relative to the ground upon which the vehicle 10 is resting (e.g., moving toward the trailer 38). In examples that employ the wheel rotation sensor 70, one or more wheels 74 of the vehicle 10 may be provided with the wheel rotation sensor 70. In such an example, a circumference of the wheel 74 is known and a rotational displacement of the wheel 74 between the first time point and the second time point can be monitored by the wheel rotation sensor 70. Accordingly, the rotational displacement of the wheel 74 can be employed in determining a corresponding arc length of the circumference of the wheel 74. The corresponding arc length of the circumference of the wheel 74 may then be used as the distance traveled between the first time point and the second time point. In various examples, the sensing system 58 can be provided with the global positioning system 66 and the wheel rotation sensor 70. In such examples, the distance traveled by the vehicle 10 between the first time point and the second time point may be obtained in duplicate. Such duplicate measurement of the distance traveled may enhance accuracy of the measured distance.

With specific reference to FIG. 2, the vehicle 10 may be a motor vehicle. For example, the vehicle 10 may be an automobile. While the vehicle 10 may be a motor vehicle, the present disclosure is not limited to internal combustion engines as a source of locomotive power for the vehicle 10. Rather, alternative sources may be utilized in providing locomotive power to the vehicle 10. For example, locomotive power may be provided to the vehicle 10 by electric motors, fuel cells, and/or petroleum-based fuel engines. According to various examples, the vehicle 10 may be driver-controlled, semi-autonomous, fully-autonomous, or any combination of user-controlled and automated. For example, the semi-autonomous example of the vehicle 10 may perform many or all commuting functions (e.g., braking, turning, signaling, parking, etc.) independent of user interaction while the user maintains override control of the vehicle 10.

Referring now to FIGS. 3-6, as the distance 34 between the vehicle 10 and the trailer 38 is altered (e.g., decreased), a location of each of the keypoints 42 of the trailer 38 is also altered. For example, a pixel location of each of the keypoints 42 of the trailer 38 within the scene data 26 at the first time point may represent the first position of the keypoints 42. Similarly, a pixel location of each of the keypoints 42 of the trailer 38 within the scene data 26 at the second time point may represent the second position of the keypoints 42. The change between the first position and the second position can be attributed to a change in perspective of the imager 62 as a result of the change in the distance 34 between the vehicle 10 and the trailer 38. The change in the distance 34 between the vehicle 10 and the trailer 38 between the first time point and the second time point may be referred to as a translation of the vehicle 10, or more concisely as vehicle translation. As will be discussed in further detail herein, the vehicle translation (e.g., the change in the distance 34 between the first time point and the second time point) can be known or estimated by the controller 22. The vehicle translation also includes directional information. Said another way, the vehicle translation may be a vector that is estimated by the controller 22 and includes both direction of movement and magnitude of movement. In addition to the estimation of the vehicle translation by the controller 22, the controller 22 can also estimate a rotation of the vehicle 10 between the first time point and the second time point. The rotation of the vehicle 10 may be referred to more concisely as the vehicle rotation. When the controller knows the estimated vehicle translation and the estimated vehicle rotation, one or more dimensions of the trailer 38 can be estimated based on the change between the first position and the second position. In one specific example, the at least one measurement of the trailer 38 can be calculated based on the estimated vehicle translation and the estimated vehicle rotation between the first time point and the second time point. In various examples, the at least one measurement of the trailer 38 can be chosen from a length 78 of the trailer 38, a width 82 of the trailer 38, and a height 86 of a trailer coupler 90. Said another way, the at least one measurement of the trailer 38 can be the length 78 of the trailer 38, the width 82 of the trailer 38, and/or the height 86 of the trailer coupler 90.

Referring again to FIGS. 3-6, when the vehicle 10 is produced, the extrinsic transformation matrix shown at Equation 1 is typically known. In Equation 1, a superscript T represents a transpose operation. Additionally, in Equation 1, $R_{local2cam}$ represents the three-by-three orthogonal rotation matrix from a local coordinate frame of the vehicle 10 to a coordinate frame of the imager 62; $p_{sensor,local}$ represents the three-by-one position vector of a center of the imager 62 in the local coordinate frame of the vehicle 10; and $P_{local2cam}$ represents the four-by-four extrinsic projection matrix that maps a three-dimensional point represented in the local coordinate frame of the vehicle 10 into an equivalent position in the coordinate frame of the imager 62. For example, given a point $p_{0,local}$ in the local coordinate frame of the vehicle 10, the equivalent coordinate in the coordinate frame of the imager 62, $p_{0,cam}$ is given by Equation 2.

$$P_{local2cam} = \begin{bmatrix} R_{local2cam} & t_{local2cam} \\ 0^T & 1 \end{bmatrix} = \quad \text{(Equation 1)}$$

$$\begin{bmatrix} R_{local2cam} & -R_{local2cam}p_{sensor,local} \\ 0^T & 1 \end{bmatrix}$$

$$s\begin{bmatrix} p_{0,cam} \\ 1 \end{bmatrix} = P_{local2cam}\begin{bmatrix} p_{0,local} \\ 1 \end{bmatrix} \quad \text{(Equation 2)}$$

Intrinsic calibration parameters are also known and maintained (e.g., by the controller 22) within an intrinsic matrix, K, for the imager 62. Equation 3 provides an example of the intrinsic matrix, K, where $f_x$ is the x-direction focal length of the imager 62, $f_y$ is the y-direction focal length of the imager 62, s is a skewness parameter that is often set to zero, $c_x$ is the x-coordinate of a principal point of the image in pixels, and $c_y$ is the y-coordinate of the principal point of the image in pixels.

$$K = \begin{bmatrix} f_x & s & c_x \\ 0 & f_y & c_y \\ 0 & 0 & 1 \end{bmatrix} \quad \text{(Equation 3)}$$

When the distance 34 between the vehicle 10 and the trailer 38 is altered (e.g., decreased by backing toward the trailer 38), at time, t, a localization algorithm is run to output a position and orientation of the vehicle 10 with respect to coordinates within the world (e.g., geographic coordinates). For example, see Equation 4.

$$P_{veh,world}(t), R_{world2local}(t) = \text{localizationAlgorithm(sensorInputs}(t)) \quad \text{(Equation 4)}$$

In Equation 4, $p_{veh,world}$ represents the position of the vehicle 10 in a fixed world coordinate frame and the rotation matrix $R_{world2local}$ describes the orientation of the local coordinate frame of the vehicle 10 relative to the fixed world coordinate frame. The localization algorithm can be any algorithm that provides localization information. In various examples, wheel odometry (e.g., from the wheel rotation sensor 70), the imager 62, LiDAR, radar, or a GPS sensor may provide information that is utilized in Equation 4 to obtain the position and/or the orientation of the vehicle 10.

The position and the orientation of the vehicle 10 are used to build the extrinsic transformation matrix between the local coordinates of the vehicle 10 and the world coordinates. In one example, Equation 5 can be employed as the transformation matrix.

$$P_{world2local}(t) = \begin{bmatrix} R_{world2local}(t) & t_{world2local}(t) \\ 0^T & 1 \end{bmatrix} = \quad \text{(Equation 5)}$$

$$\begin{bmatrix} R_{world2local}(t) & -R_{world2local}(t)p_{veh,world}(t) \\ 0^T & 1 \end{bmatrix}$$

Use of the transformation matrix shown at Equation 5, as well as the transformation from the local coordinate frame of the vehicle 10 to the coordinate frame of the imager 62 discussed above, provides a direct transformation from the world coordinate frame to the coordinate frame of the imager 62 at time, t, by use of Equations 6 and 7.

$$P_{world2cam}(t) = P_{world2local}(t)P_{local2cam} \quad \text{(Equation 6)}$$

$$s\begin{bmatrix} p_{sensor,world}(t) \\ 1 \end{bmatrix} = P_{world2local}^{-1}(t)\begin{bmatrix} p_{sensor,local} \\ 1 \end{bmatrix} \quad \text{(Equation 7)}$$

Given the relationships discussed above, as the vehicle 10 backs toward the trailer 38, localization information and an image from the imager 62 are captured at the first time point and the second time point. The keypoints 42 of the trailer 38 and/or one or more keypoints 94 of a cargo item 98 (see FIGS. 5 and 6) can be identified in images associated with the first time point and the second time point, for example, by the controller 22. The keypoints 42 of the trailer 38 describe a structure of the trailer 38. Similarly, the keypoints 94 of the cargo item 98 describe the structure of the cargo item 98. Using information from the imager 62, stereo vision calculations can be employed to recover a correspondence between the two-dimensional image pixel information and the three-dimensional world coordinate frame. There are several approaches that can accomplish recovery of the correspondence between the two-dimensional image pixel information and the three-dimensional world coordinate frame. In one example, in each image that is captured by the imager 62 (e.g., at the first time point and at the second time point), the controller 22 identifies the keypoints 42 of the trailer 38 and/or the keypoints 94 of the cargo item 98. Accordingly, the controller 22 has established two sets of two-dimensional pixel coordinates, one set corresponding to the first time point and the other set corresponding to the second time point.

Figure 5:
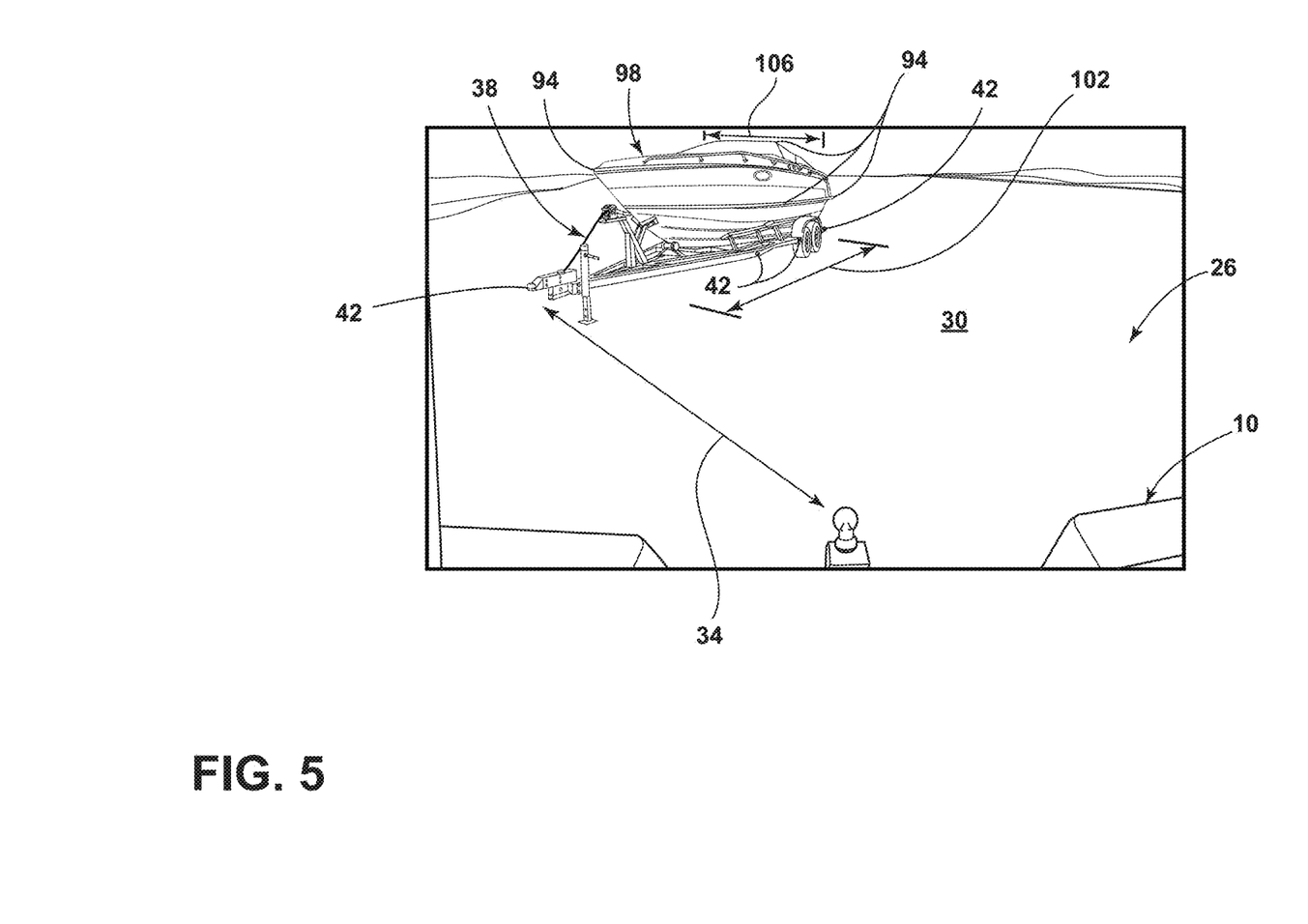
FIG. 5 is a depiction of a display of image data for presentation on the vehicle human-machine interface at a first time point, according to another example.
Figure 6:
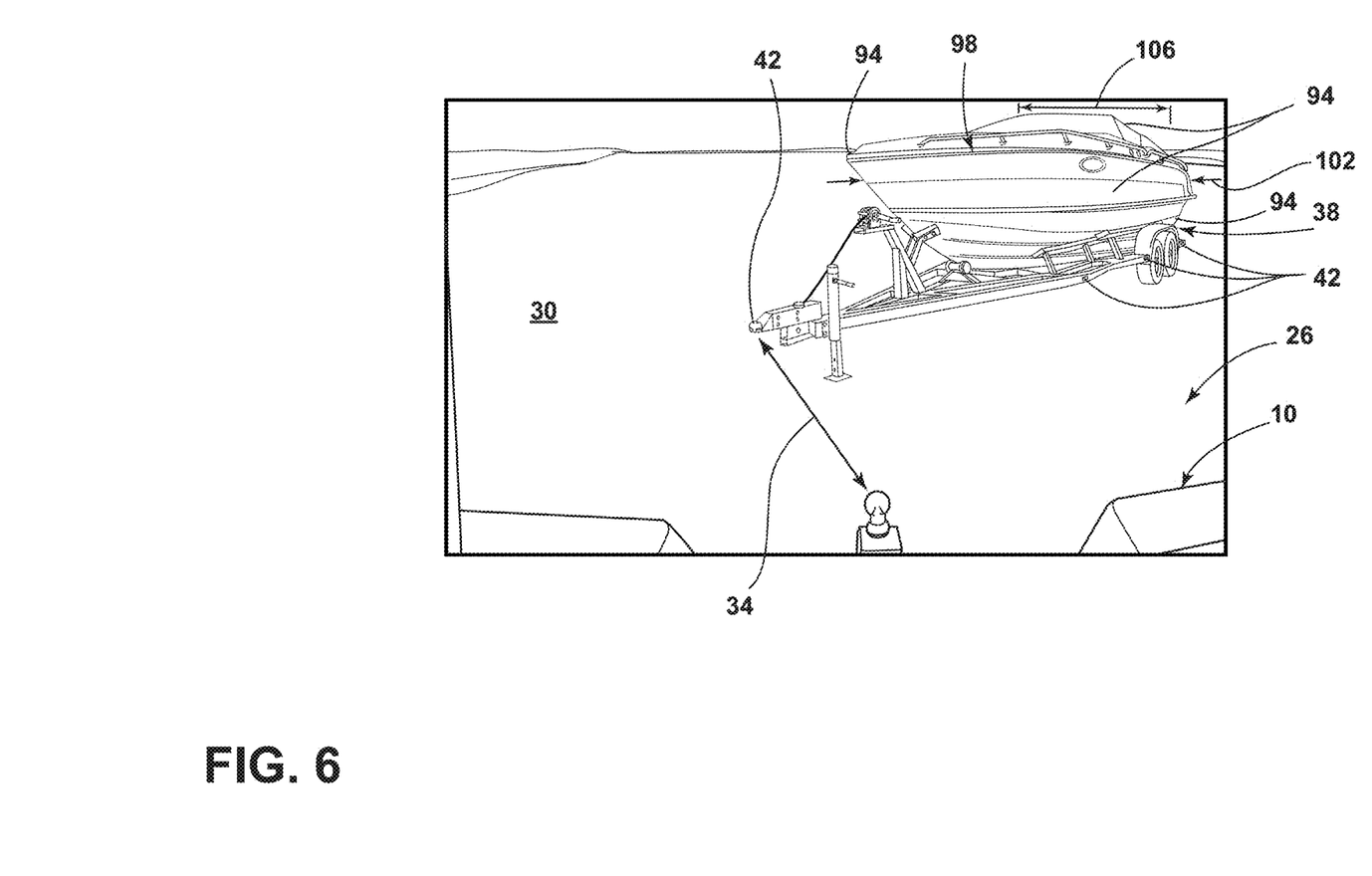
FIG. 6 is a depiction of a display of image data for presentation on the vehicle human-machine interface at a second time point, according to another example.

With the foregoing information, it is possible to recover the keypoints 42 of the trailer 38 and/or the keypoints 94 of the cargo item 98 within the three-dimensional world coordinate frame by way of triangulation. In theory, the keypoints 42 of the trailer 38 and/or the keypoints 94 of the cargo item 98 can be exact because a pixel identified in one image (e.g., at the first time point) is guaranteed to lie along a single line, or "ray," emanating from the imager 62 at a given azimuth and elevation angle. However, with a single image, it is unknown where along this line, or ray, the point lies due to the depth information being unknown. By capturing the second image (e.g., at the second time point) from a different perspective, a new line, or ray, is defined along which the point must also lie. The intersection of the two lines, or rays, can yield the point's position within the three-dimensional world coordinate frame.

With specific reference to FIGS. 5 and 6, when the trailer 38 includes the cargo item 98 (e.g., a boat), the controller 22 can identify the plurality of keypoints 94 of the cargo item 98 at the first time point. In such examples, the positioning of the plurality of keypoints 94 of the cargo item 98 (e.g., pixel location) at the first time point can represent a first location. Similarly, the controller 22 can identify the plurality of keypoints 94 of the cargo item 98 at the second time point, with the positioning of the plurality of keypoints 94 of the cargo item 98 at the second time point representing a second location. In various examples, the controller 22 can estimate one or more dimensions of the cargo item 98 based on a change between the first location and the second location. For example, as discussed above, the controller 22 may estimate a vehicle translation and estimate a vehicle rotation of the vehicle 10 between the first time point and the second time point. The controller 22 can estimate the vehicle translation and/or the vehicle rotation by referencing one or more of a number of available sensors. For example, the controller 22 can estimate the vehicle translation and/or the vehicle rotation by referencing the global positioning system 66, an internal measurement unit, a wheel speed sensor, a camera, radar sensor(s), and/or ultrasonic sensor(s). When the vehicle translation and the vehicle rotation of the vehicle 10 have been estimated, the change between the first location and the second location within the scene data 26 can be used to calculate the one or more dimensions of the cargo item 98. As discussed above, the controller 22 may estimate the vehicle translation and estimate the vehicle rotation between the first time point and the second time point by referencing the global positioning system 66 and/or by referencing the wheel rotation sensor 70.

Referring again to FIGS. 5 and 6, the estimation of the one or more dimensions of the cargo item 98 based on the change between the first location and the second location can include calculating at least one measurement of the cargo item 98 based on the estimated vehicle translation and estimated vehicle rotation of the vehicle 10. In various examples, the at least one measurement of the cargo item 98 can be chosen from a length 102 of the cargo item 98 and a width 106 of the cargo item 98. Said another way, the length 102 of the cargo item 98 and/or the width 106 of the cargo item 98 may be the at least one measurement calculated based on the estimated vehicle translation and the estimated vehicle rotation.

Referring further to FIGS. 3-6, once the controller 22 has calculated one or more measurements of the trailer 38 and/or calculated one or more measurements of the cargo item 98, the controller 22 can determine the one or more future vehicle paths based on such information. The one or more future vehicle paths correspond with vehicle maneuvers while the trailer 38 is coupled to the vehicle 10. In some examples, the controller 22 may adjust the one or more future vehicle paths based on the estimating of the one or more dimensions of the cargo item 98 and/or based on the calculation of the at least one measurement of the cargo item 98. For example, in situations where at least a portion of the cargo item 98 (e.g., a portion of the length 102 and/or a portion of the width 106) extends beyond a corresponding dimension of the trailer 38, the controller 22 may adjust the one or more future vehicle paths to account for the increase in such dimension. In one specific example, a portion of a length of a boat (e.g., an outboard motor thereof) may extend beyond the length 78 of the trailer 38. In such a scenario, the controller 22 can account for this dimensional adjustment in planning future vehicle paths in an effort to prevent, for example, a side-swipe event and/or account for such dimensional adjustment(s) when backing the trailer 38. One specific example where the width 106 of the cargo item 98 may extend beyond the width 82 of the trailer 38 is when the cargo item 98 is a pontoon boat. More specifically, some pontoon boat trailers provide central supports for the pontoon boat and are arranged to have the pontoons positioned outside of the central supports of the trailer. In an alternative example, when the trailer 38 is a utility trailer, the cargo item 98 may be an item that is being hauled that extends beyond the length 78 of the trailer 38 and/or extends beyond the width 82 of the trailer 38.

Figure 7:
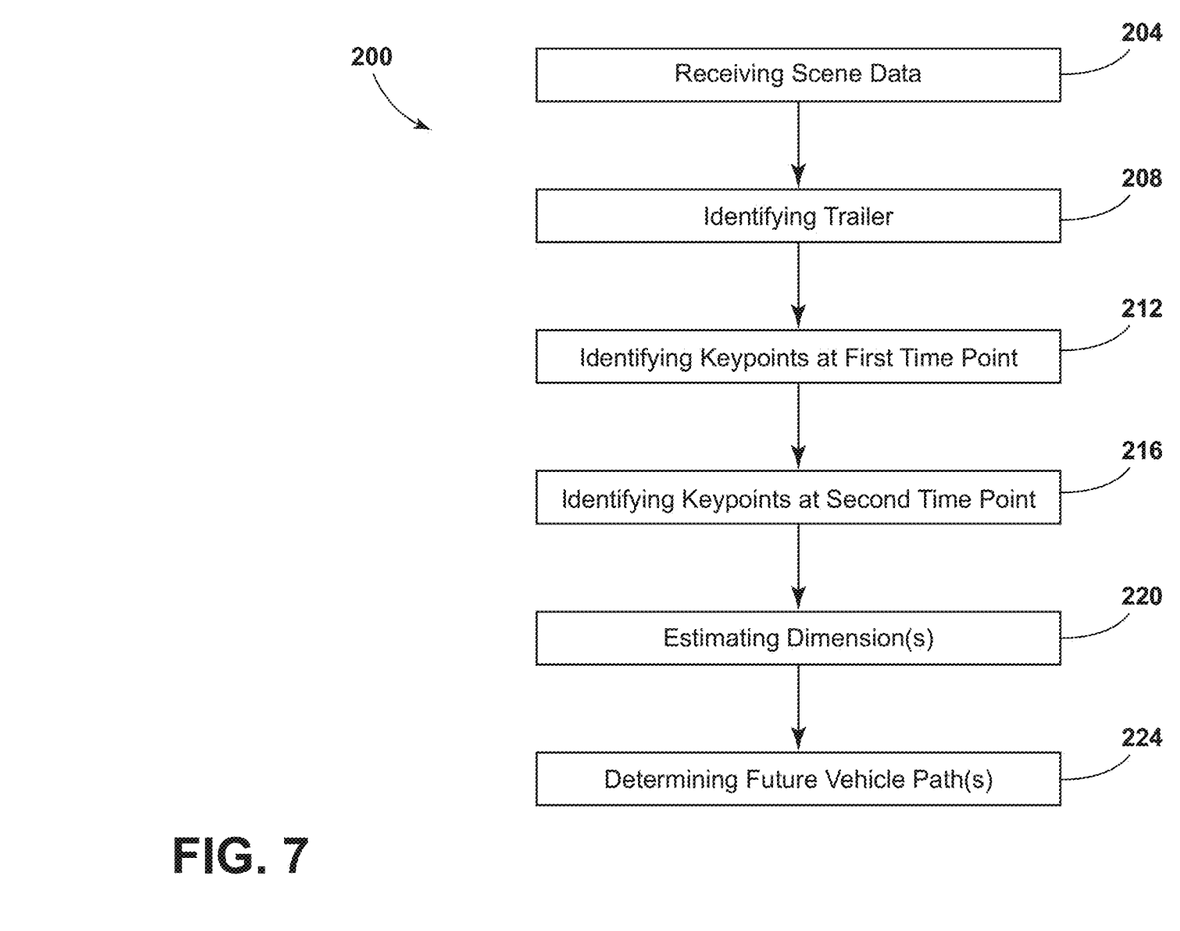
FIG. 7 is a flow diagram depicting a method of determining a future vehicle path based on image data, according to one example.

Referring now to FIG. 7, a method 200 of determining a future vehicle path is shown according to one example. The method 200 includes step 204 of receiving scene data 26 (e.g., from the imager 62). The method 200 also includes step 208 of identifying the trailer 38 within the scene data 26. In some examples, the method 200 includes a step of identifying the cargo item 98. The method 200 can include step 212 of identifying keypoints at a first time point. The keypoints identified at step 212 may include the keypoints 42 of the trailer 38 and/or the keypoints 94 of the cargo item 98. The method 200 further includes step 216 of identifying the keypoints at a second time point. The method 200 also includes step 220 of estimating one or more dimensions of the trailer 38 and/or the cargo item 98. In various examples, the method 200 includes step 224 of determining the future vehicle path(s). In some examples, the method 200 may include a step of adjusting the future vehicle path(s) based on one or more determined dimensions of the cargo item 98.

The present disclosure provides the system 14 for the vehicle 10 that is capable of obtaining dimensional information about the trailer 38 and/or the cargo item(s) 98 as a result of normal hitching sequences that the user undertakes (e.g., backing toward the trailer 38). Accordingly, the user is saved time and effort in inputting information about the trailer 38 into the vehicle 10 (e.g., by way of a human-machine interface 110). In various examples, the controller 22 may store dimensional information of the trailer(s) 38 that the vehicle 10 has encountered. In such an example, the previously-coupled trailer(s) 38 may be stored in the memory 50 and accessed for future coupling events.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A system for a vehicle, comprising:
   an imaging system outputting a signal that includes scene data of an area to a rear of the vehicle; and
   a controller:
      receiving the scene data while a distance between the vehicle and a trailer is altered, the trailer comprising a trailer body and a trailer coupler;
      identifying the trailer within the area to the rear of the vehicle;
      identifying a plurality of keypoints of the trailer body and the trailer coupler at a first time point, the positioning of the plurality of keypoints of the trailer body and the trailer coupler at the first time point representing a first position;
      identifying the plurality of keypoints of the trailer body and the trailer coupler at a second time point, the positioning of the plurality of keypoints of the trailer body and the trailer coupler at the second time point representing a second position;
      estimating a vehicle translation between the first time point and the second time point;
      estimating a vehicle rotation between the first time point and the second time point;
      estimating one or more dimensions of the trailer based on a change between the first position and the second position, wherein the estimating one or more dimensions of the trailer based on the change between the first position and the second position comprises calculating at least one measurement of the trailer based on the estimated vehicle translation and the estimated vehicle rotation;
      determining one or more future vehicle paths based on the estimating of the one or more dimensions of the trailer, wherein the one or more future vehicle paths correspond with vehicle maneuvers while the trailer is coupled to the vehicle; and
      maneuvering the vehicle based on the determination of one or more future vehicle paths.

2. The system for a vehicle of claim 1, wherein the controller estimates the vehicle translation and estimates the vehicle rotation between the first time point and the second time point by referencing a global positioning system of the vehicle or by referencing a wheel rotation sensor of the vehicle.

3. The system for a vehicle of claim 2, wherein the at least one measurement of the trailer is chosen from a length of the trailer, a width of the trailer body, and a height of the trailer coupler.

4. The system for a vehicle of claim 1, wherein the controller:
   identifies a cargo item carried by the trailer.

5. The system for a vehicle of claim 4, wherein the controller:
   identifies a plurality of keypoints of the cargo item at the first time point, the positioning of the plurality of keypoints of the cargo item at the first time point representing a first location; and
   identifies the plurality of keypoints of the cargo item at the second time point, the positioning of the plurality of keypoints of the cargo item at the second time point representing a second location.

6. The system for a vehicle of claim 5, wherein the controller:
   estimates one or more dimensions of the cargo item based on a change between the first location and the second location.

7. The system for a vehicle of claim 6, wherein the controller:
estimates the vehicle translation between the first time point and the second time point; and
estimates the vehicle rotation between the first time point and the second time point.

8. The system for a vehicle of claim 7, wherein the controller estimates the vehicle translation and estimates the vehicle rotation between the first time point and the second time point by referencing a global positioning system of the vehicle or by referencing a wheel rotation sensor of the vehicle.

9. The system for a vehicle of claim 7, wherein the estimating one or more dimensions of the cargo item based on the change between the first location and the second location comprises calculating at least one measurement of the cargo item based on the estimated vehicle translation and the estimated vehicle rotation.

10. The system for a vehicle of claim 9, wherein the at least one measurement of the cargo item is chosen from a length of the cargo item and a width of the cargo item.

11. The system for a vehicle of claim 10, wherein the controller:
adjusts the one or more future vehicle paths based on the estimating of the one or more dimensions of the cargo item.

12. The system for a vehicle of claim 1, wherein the imaging system includes a camera mounted on a rear of the vehicle and capturing at least a portion of the area to the rear of the vehicle.

13. A system for a vehicle, comprising:
an imaging system outputting a signal that includes scene data of an area to a rear of the vehicle; and
a controller:
receiving the scene data while a distance between the vehicle and a trailer is altered;
identifying the trailer within the area to the rear of the vehicle;
identifying a plurality of first keypoints of the trailer at a first time point, the positioning of the plurality of first keypoints of the trailer at the first time point representing a first position, wherein each of the first keypoints correspond to a portion of a structure of the trailer;
identifying the plurality of second keypoints of the trailer at a second time point, the positioning of the plurality of second keypoints of the trailer at the second time point representing a second position, wherein each of the second keypoints substantially correspond to each of the first keypoints;
estimating a vehicle translation between the first time point and the second time point;
estimating a vehicle rotation between the first time point and the second time point;
estimating one or more dimensions of the trailer based on a change between the first position and the second position, as well as the estimated vehicle translation and the estimated vehicle rotation, wherein the estimating one or more dimensions of the trailer based on the change between the first position and the second position comprises calculating at least one measurement of the trailer based on the estimated vehicle translation and the estimated vehicle rotation, and wherein the at least one measurement of the trailer is chosen from a length of the trailer, a width of the trailer, and a height of a trailer coupler;
determining one or more future vehicle paths based on the estimating of the one or more dimensions of the trailer, wherein the one or more future vehicle paths correspond with vehicle maneuvers while the trailer is coupled to the vehicle; and
maneuvering the vehicle based on the determination of one or more future vehicle paths.

14. The system for a vehicle of claim 13, wherein the controller estimates the vehicle translation and estimates the vehicle rotation between the first time point and the second time point by referencing a global positioning system of the vehicle or by referencing a wheel rotation sensor of the vehicle.

15. The system for a vehicle of claim 13, wherein the controller:
identifies a cargo item carried by the trailer;
identifies a plurality of keypoints of the cargo item at the first time point, the positioning of the plurality of keypoints of the cargo item at the first time point representing a first location;
identifies the plurality of keypoints of the cargo item at the second time point, the positioning of the plurality of keypoints of the cargo item at the second time point representing a second location; and
estimates one or more dimensions of the cargo item based on a change between the first location and the second location.

16. The system for a vehicle of claim 15, wherein the estimation of the one or more dimensions of the cargo item based on the change between the first location and the second location comprises calculating at least one measurement of the cargo item based on the estimated vehicle translation and the estimated vehicle rotation, and wherein the at least one measurement of the cargo item is chosen from a length of the cargo item and a width of the cargo item.

17. The system for a vehicle of claim 16, wherein the controller:
adjusts the one or more future vehicle paths based on the estimating of the one or more dimensions of the cargo item.

18. The system for a vehicle of claim 13, wherein the imaging system includes a camera mounted on a rear of the vehicle and capturing at least a portion of the area to the rear of the vehicle.

* * * * *